United States Patent
Ma et al.

(10) Patent No.: US 12,556,327 B2
(45) Date of Patent: Feb. 17, 2026

(54) DATA TRANSMISSION METHOD, TRANSMISSION DEVICE, AND STORAGE MEDIUM

(71) Applicant: ZTE CORPORATION, Shenzhen (CN)

(72) Inventors: Yihua Ma, Shenzhen (CN); Zhifeng Yuan, Shenzhen (CN); Weimin Li, Shenzhen (CN); Zhigang Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 336 days.

(21) Appl. No.: 18/042,868

(22) PCT Filed: Jun. 1, 2021

(86) PCT No.: PCT/CN2021/097570
§ 371 (c)(1),
(2) Date: Feb. 24, 2023

(87) PCT Pub. No.: WO2022/041904
PCT Pub. Date: Mar. 3, 2022

(65) Prior Publication Data
US 2023/0318771 A1    Oct. 5, 2023

(30) Foreign Application Priority Data

Aug. 28, 2020 (CN) .................. 202010888286.7

(51) Int. Cl.
*H04L 5/00* (2006.01)
*H04L 27/26* (2006.01)
(52) U.S. Cl.
CPC ........ *H04L 5/0048* (2013.01); *H04L 27/2613* (2013.01)

(58) Field of Classification Search
CPC .................. H04L 5/0048; H04L 27/2613
See application file for complete search history.

(56) References Cited

U.S. PATENT DOCUMENTS

2005/0281290 A1* 12/2005 Khandekar ........... H04L 5/0048
370/510
2019/0229964 A1   7/2019 Ouchi et al.
(Continued)

FOREIGN PATENT DOCUMENTS

CN         104052706 A      9/2014
CN         107852205 A      3/2018
(Continued)

OTHER PUBLICATIONS

First Office Action in Chinese Application No. 2020108882867 dated Aug. 19, 2024, 8 pages including translation.
(Continued)

*Primary Examiner* — Brian P Cox
(74) *Attorney, Agent, or Firm* — Morgan, Lewis & Bockius LLP

(57) ABSTRACT

Provided are a data transmission method and apparatus, a transmission device, and a storage medium. The method includes the following: determining a first reference signal and a second reference signal associated with the first reference signal, where the second reference signal is used for assisting a receiving end in detecting an active sequence in the first reference signal; and sending a transmission packet, where the transmission packet includes the first reference signal, the second reference signal and transmitted data.

20 Claims, 6 Drawing Sheets

(56) References Cited

U.S. PATENT DOCUMENTS

2019/0260526 A1     8/2019   Zhang et al.
2019/0372733 A1    12/2019   Wu et al.

FOREIGN PATENT DOCUMENTS

| CN | 107888354 A | 4/2018 |
|---|---|---|
| CN | 108282309 A | 7/2018 |
| CN | 112039648 A | 12/2020 |
| EP | 3297239 A1 | 3/2018 |
| JP | 2004112501 A | 4/2004 |
| WO | WO2017000233 A1 | 1/2017 |
| WO | WO 2017/140948 A1 | 8/2017 |

OTHER PUBLICATIONS

First Search Report in Chinese Application No. 202010888286.7 dated Aug. 26, 2024, 10 pages including translation.
First Office Action in Canadian Application No. 3190759 dated Jul. 29, 2024, 6 pages.
Extended Search Report in European Application No. 21859748.2 dated Sep. 13, 2024, 7 pages.
International Search Report in Application No. PCT/CN2021/097570 dated Aug. 18, 2021, 4 pages, including translation.
First Office Action in Korean Application No. 10-2023-7010015 dated Jun. 23, 2025, 15 pages, including translation.
ZTE, "Updated offline summary of transmitter side signal processing schemes for NOMA", 3GPP TSG RAN WG1 Meeting #94, R1-1809974, Gothenburg, Sweden, Aug. 20-24, 2018.

* cited by examiner

DATA TRANSMISSION METHOD, TRANSMISSION DEVICE, AND STORAGE MEDIUM

CROSS REFERENCE TO RELATED APPLICATIONS

This is a National Stage Application filed under 35 U.S.C. 371, based on International Patent Application No. PCT/CN2021/097570 filed on Jun. 1, 2021, which claims priority to Chinese Patent Application No. 202010888286.7 filed with the China National Intellectual Property Administration (CNIPA) on Aug. 28, 2020, the disclosures of which are incorporated herein by reference in their entireties.

TECHNICAL FIELD

The present application relates to wireless communications, for example, a data transmission method, a transmission device, and a storage medium.

BACKGROUND

In a mobile communication system, a receiving end may determine channel related information about transceiver antennas according to a reference signal sent by a transmitting end. For example, the receiving end may obtain correct transmission data by detecting the reference signal to determine a channel used by the transceiver antennas and perform channel estimation, performing coherent detection and decoding on the transmission data, and the like. Compared with an orthogonal reference signal, a non-orthogonal reference signal can provide richer information and support connections of mass devices. However, in such a many-to-one data transmission scenario, the receiving end generally needs to detect the reference signal by using a compression sensing-based algorithm and perform the channel estimation to recover the transmitted data and complete data reception. For example, the reference signal may be detected by using a method such as $l_1$ norm or $l_2$ norm minimization, a greedy iterative algorithm, or approximate message passing, and the channel estimation is performed. The above methods all require iterative operations, and the computational complexity is relatively high. In particular, when the receiving end is a device of large-scale antenna technologies, matrix multiplication and a large amount of complex multiplication in the iteration affect the detection of the reference signal, thereby affecting the efficiency of data transmission.

SUMMARY

The present application provides a data transmission method and apparatus, a transmission device, and a storage medium to reduce the complexity of detecting a first reference signal and improve the efficiency of data transmission.

Embodiments of the present application provide a data transmission method. The method includes the following.

A first reference signal and a second reference signal associated with the first reference signal are determined, where the second reference signal is used for assisting a receiving end in detecting an active sequence in the at least one received first reference signal.

A transmission packet is sent, where the transmission packet includes the first reference signal, the second reference signal and transmitted data.

Embodiments of the present application further provide a data transmission method. The method includes the following.

A transmission packet is received, where the transmission packet includes at least one first reference signal, a second reference signal associated with each first reference signal, and transmitted data.

An active sequence in the at least one first reference signal is detected according to at least one second reference signal associated with the at least one first reference signal.

Corresponding receiving data is determined according to the active sequence in the at least one first reference signal.

Embodiments of the present application further provide a data transmission apparatus. The data transmission apparatus includes a signal determination module and a sending module.

The signal determination module is configured to determine a first reference signal and a second reference signal associated with the first reference signal, where the second reference signal is used for assisting a receiving end in detecting an active sequence in the at least one received first reference signal.

The sending module is configured to send a transmission packet, where the transmission packet includes the first reference signal, the second reference signal and transmitted data.

Embodiments of the present application further provide a data transmission apparatus. The data transmission apparatus includes a reception module, a detection module and a data determination module.

The reception module is configured to receive a transmission packet, where the transmission packet includes at least one first reference signal, a second reference signal associated with each of the at least one first reference signal, and transmitted data.

The detection module is configured to detect an active sequence in the at least one first reference signal according to at least one second reference signal associated with the at least one first reference signal.

The data determination module is configured to determine corresponding receiving data according to the active sequence of the at least one first reference signal.

Embodiments of the present application further provide a transmission device. The transmission device includes one or more processors and a storage apparatus, and the storage apparatus is configured to store one or more programs.

When executed by the one or more processors, the one or more programs cause the one or more processors to perform the preceding data transmission method.

Embodiments of the present application further provide a computer-readable storage medium for storing a computer program which, when executed by a processor, causes the processor to perform the preceding data transmission method.

DETAILED DESCRIPTION

Figure 1:
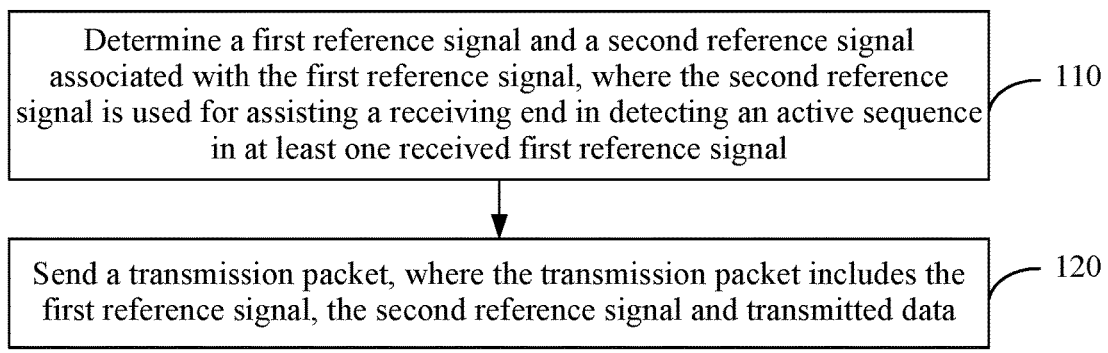
FIG. 1 is a flowchart of a data transmission method according to an embodiment.

The present application is described hereinafter in conjunction with drawings and embodiments. If not in collision, the embodiments of the present application and features in the embodiments may be combined with each other. For ease of description, only part, not all, of structures related to the present application are illustrated in the drawings.

In a process of scheduling-free transmission, non-orthogonal reference signals are used for recovering data, which can support the connections of mass devices. The receiving end usually adopts the compression sensing-based algorithm to perform the pilot detection and the channel estimation, so as to determine an active reference signal. A sending end device corresponding to the active reference signal has a stronger capability, and the quality of a communication link between the sending end and the receiving end is higher, so that the communication link can successfully access a network. For example, when pilots (reference signals) are detected, the $l_1/l_2$ norm minimization method can be used. Since $l_0$ norm minimization is a Non-deterministic Polynomial (NP) complete problem, the $l_1/l_2$ norm minimization can transform the NP complete problem into an optimization problem and obtain an optimal solution, but a lot of iterative calculation is required. For another example, when the greedy iterative algorithm is used, the detected pilots can be recovered in one iteration, then these pilots are used for performing the channel estimation, and residuals of the signals are calculated for performing the next iteration. The approximate message passing method can also be used, and this method can avoid a matrix inversion in the greedy iterative algorithm and reduce the computational complexity to a certain extent, but the approximate message passing method also needs the iteration. The complexity of the above iterative calculation methods is high, especially in a case where the receiving end uses the Multiple In Multiple Out (MIMO) antenna technology, the matrix multiplication in the iterative calculation may cause a large number of complex multiplications, and the efficiency of detecting the reference signal is low, thus affecting the efficiency of data transmission.

An embodiment of the present application provides a data transmission method, and the method is applied to a sending end such as a User Equipment (UE). A first reference signal and transmitted data are included in a sent transmission packet, and a second reference signal associated with the first reference signal is added for assisting the receiving end in efficiently detecting an active sequence of the first reference signal in the received signal.

FIG. 1 is a flowchart of a data transmission method according to an embodiment. As shown in FIG. 1, the method provided in this embodiment includes operations 110 and 120 described below.

In operation 110, the first reference signal and the second reference signal associated with the first reference signal are determined, where the second reference signal is used for assisting a receiving end in detecting an active sequence in at least one received first reference signal.

In operation 120, the transmission packet is sent, where the transmission packet includes the first reference signal, the second reference signal and the transmitted data.

In this embodiment, the first reference signal is configured to recover the transmitted data, and the receiving end may determine a sending end device that can successfully access the network by detecting the active sequence in the first reference signal, and complete the channel estimation or the spatial domain combining vector estimation, so that the transmitted data can be accurately processed. In a process of transmitting the first reference signal and the transmitted data, the sending end also sends one second reference signal uniquely corresponding to the first reference signal, and the first reference signal and the second reference signal in the transmission packet have an association relationship.

Figure 2:
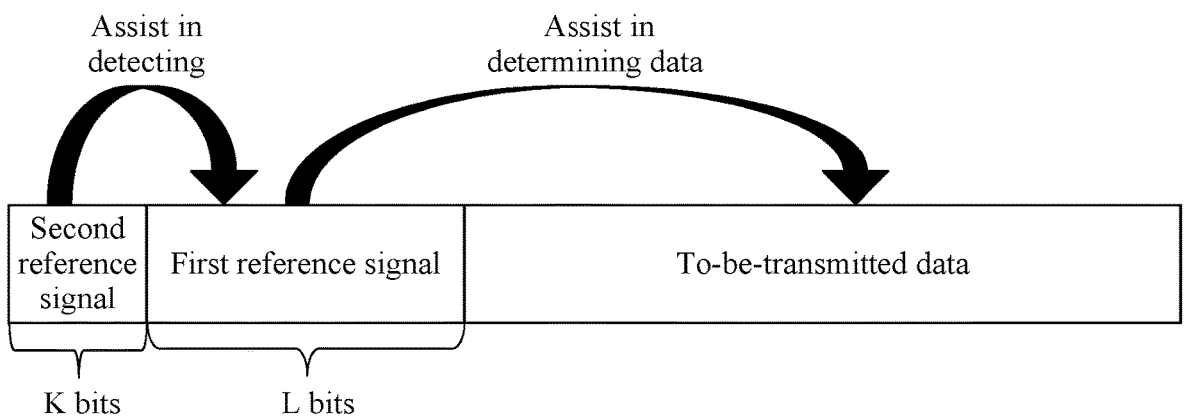
FIG. 2 is a schematic diagram of a transmission packet according to an embodiment.

FIG. 2 is a schematic diagram of a transmission packet according to an embodiment. As shown in FIG. 2, the transmission packet includes the first reference signal (L bits), the second reference signal (K bits) and transmitted data, i.e., to-be-transmitted data. The second reference signal is used for assisting the receiving end in detecting the active sequence in the first reference signal. The first reference signal provides a basis for the receiving end to perform the channel estimation and analyze the transmitted data, that is, the first reference signal is used for assisting in determining the transmitted data.

The receiving end may simultaneously receive multiple second reference signals from different sending ends, according to an error between each sequence in the sequence set for the second reference signals received by antennas and the ground-truth second reference signal, it may be determined which second reference signal or which second reference signals can be effectively recovered, and a first reference signal associated with the second reference signal which can be effectively recovered is the active sequence in the first reference signal. According to the active sequence in the first reference signal, the channel estimation or the spatial domain combining vector estimation can be completed, and the transmitted data can be accurately processed. The smaller the error between the received second reference signal and the ground-truth second reference signal, the higher the activity degree of the first reference signal associated with the second reference signal. In an ideal condition (no noise and no interference), for an active pilot, the ground-truth second reference signal can be recovered with an error of 0, while for an inactive pilot, the ground-truth second reference signal cannot be recovered.

In some embodiments, the active sequence in the first reference signal may refer to a first reference signal with a calculated error less than or equal to a set threshold, or a first reference signal with a calculated activity degree greater than or equal to a set threshold, or a set number of first reference signals with the minimum error (or the maximum activity degree).

According to the data transmission method in this embodiment, the sent transmission packet includes the first reference signal and the transmitted data, and a second reference signal is added to the transmission packet so as to assist the receiving end in efficiently detecting the active sequence of the first reference signal in the received signal and to avoid the iterative calculation, thereby reducing the complexity of detecting the first reference signal. On this basis, the sending end can receive the transmitted data according to the detected first reference signal, thereby improving the efficiency of data transmission.

In an embodiment, in at least one transmission packet received by the receiving end, the active sequence in the first reference signal includes one of the following: at least one sequence in a first reference signal sequence set; at least one sequence with different time domain offsets in a first reference signal sequence set; at least one sequence with different frequency domain offsets in a first reference signal sequence set; or at least one sequence with different time domain offsets and different frequency domain offsets in a first reference signal sequence set.

In this embodiment, the first reference signal transmitted by the sending end is represented as a sequence with the length of L, and this sequence may be further divided into sequences having different time domain offsets and/or frequency domain offsets. Since the sequence may be distorted or deformed after experiencing a time domain offset or a frequency domain offset of the channel, the receiving end may further estimate the time domain offset and/or the frequency domain offset of the corresponding sequence on the basis of detecting the active sequence in the first reference signal.

In an embodiment, the first reference signal is one sequence in the first reference signal sequence set, the second reference signal is one sequence in the second reference signal sequence set, and sequences in the first reference signal sequence set and sequences in the second reference signal sequence set satisfy a many-to-one mapping relationship or a one-to-one mapping relationship, where any one sequence in the first reference signal sequence set is mapped to a unique sequence in the second reference signal sequence set. One reference signal may be represented as one sequence.

In this embodiment, the receiving end may receive the transmission packet from one or more sending ends, i.e., at least one first reference signal and the second reference signal associated with at least one first reference signal are received, first reference signals that may be sent by each sending end constitute the first reference signal sequence set, and second reference signals that may be sent by each sending end constitute the second reference signal sequence set. The receiving end detects the active sequence in the first reference signal from the first reference signal sequence set according to the received second reference signal. The one-to-one mapping relationship means that each sequence in the first reference signal sequence set is respectively associated with a different sequence in the second reference signal sequence set, and the many-to-one mapping relationship means that one or more sequences in the first reference signal sequence set may be associated with the same sequence in the second reference signal sequence set. For any one sequence in the first reference signal sequence set, there must be a unique sequence in the second reference signal sequence set corresponding to the one sequence, so that the receiving end can definitely detect whether the associated first reference signal is active according to each second reference signal.

The specific mapping relationship is not limited in this embodiment.

The one-to-one mapping relationship is used as an example, and the number of sequences in the first reference signal sequence set and the number of sequences in the second reference signal sequence set are the same. If the number of sequences in the first reference signal sequence set is N and the first reference signal is represented as a sequence with the length of L, the number of sequences in the second reference signal sequence set is also N and the second reference signal is a sequence with the length of K, where $N > L > K \geq 1$. The sending end may select one sequence of the first reference signal through pre-configuration or random selection for sending, for example, the sending end sends an $n^{th}$ sequence in the first reference signal sequence set, where $1 \leq n \leq N$, and then the sending end also sends an $n^{th}$ sequence in the second reference signal sequence set in the transmission packet and sends the transmitted data.

In an embodiment, the length of the first reference signal is greater than the length of the second reference signal. In this embodiment, if the length of the first reference signal is L and the length of the second reference signal is K, L is greater than K, thereby controlling an overhead of transmitting the second reference signal while assisting in detecting the first reference signal is realized.

In an embodiment, the number of sequences in the first reference signal sequence set is greater than or equal to the number of sequences in the second reference signal sequence set.

In this embodiment, in the case where the number of sequences in the first reference signal sequence set is equal to the number of sequences in the second reference signal sequence set, the one-to-one mapping relationship is satisfied between two reference signal sequence sets; and in a case where the number of sequences in the first reference signal sequence set is greater than the number of sequences in the second reference signal sequence set, the many-to-one mapping relationship is satisfied between the two reference signal sequence set.

In an embodiment, the sequences in the second reference signal sequence set are orthogonal, and the second reference signal sequence set is one of the following: a Hadamard sequence, a set of row vectors in a diagonal matrix or a set of row vectors in a Discrete Fourier Transform (DFT) matrix.

1) The Hadamard sequence, that is, the set of row vectors in a Hadamard matrix, the Hadamard matrix is an n-order square matrix composed of +1 and −1 elements and satisfying $H_n \times H_n^T = nI$ ($H_n^T$ is the transpose of $H_n$, and I is a unit square matrix), and each row vector in the Hadamard matrix is an orthogonal sequence and can be used as one second reference signal.

2) The set of row vectors in the diagonal matrix, in which all elements except elements in the main diagonal are 0, and each row vector in the diagonal matrix is an orthogonal sequence and can be used as one second reference signal.

3) The set of row vectors in the DFT matrix, that is, a row vector set of the DFT matrix, elements in the first row and the first column of the DFT matrix are all 1, and the DFT matrix is an n-order square matrix satisfying $W \times W^H = KI$ ($W^H$ is the conjugate transpose of W, K is the length of the sequence, and I is the unit square matrix), and each row vector in the DFT matrix is an orthogonal sequence and can be used as a sequence of one second reference signal.

In an embodiment, the sequences in the second reference signal sequence set are non-orthogonal, and the sequences in the second reference signal sequence set are one of the following:

1) Equiangular Tight Frames (ETF) sequences, column vectors of a matrix S satisfy the following: all column vectors have a unit norm, satisfy an isometric relationship and have a tight frame, then the set composed of column vectors of the matrix S is an isometric tight frame, and each column vector is a sequence and can be used as one sequence of the second reference signal.

2) Multi-User Shared Access (MUSA) sequences, which use complex domain multivariate codes (sequence) as an extended sequence, and a relatively low cross-correlation is kept in a case where the length of the sequence is relatively short.

3) Sequences generated based on a complex Gaussian random number.

The sequences in the second reference signal sequence set are non-orthogonal, and non-orthogonal sequences with the same length may provide a larger number of sequences compared with orthogonal sequences.

In an embodiment, the first reference signal includes at least one of the following:

1) a preamble signal, i.e., a preamble sequence, which is the beginning of a physical frame;
2) a pilot signal, which is a sequence sent by the receiving end for measurement or monitoring; or
3) a demodulation reference signal (DMRS).

In an embodiment, the mapping relationship between the sequences in the first reference signal sequence set and the sequences in the second reference signal sequence set satisfies one of the following:

1) one-to-one mapping relationship: an $n^{th}$ sequence in the first reference signal sequence set is associated with an $n^{th}$ sequence in the second reference signal sequence set, where n is a positive integer;
2) many-to-one mapping relationship: an $n^{th}$ sequence in the first reference signal sequence set is associated with an $x^{th}$ sequence in the second reference signal sequence set, where n is a positive integer, K is the number of sequences in the second reference signal sequence set, K is a positive integer, and x is mod(n−1, K)+1; or
3) many-to-one mapping relationship: an $n^{th}$ sequence in the first reference signal sequence set is associated with a $\lceil n/\lceil N/M \rceil \rceil^{th}$ sequence in the second reference signal sequence set, where n is a positive integer, M is the number of sequences in the second reference signal sequence set, M is a positive integer, N is the number of sequences in the first reference signal sequence set, and N is a positive integer.

Figure 3:
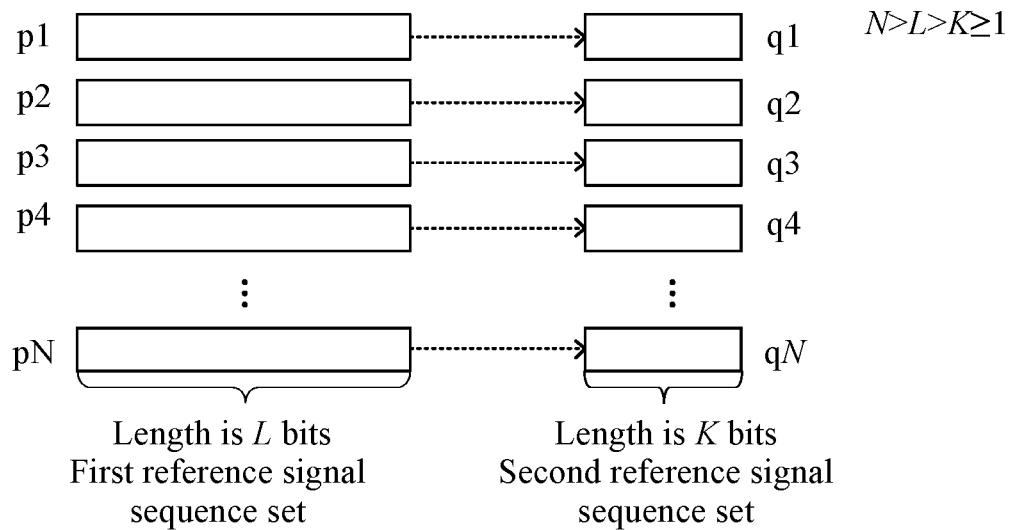
FIG. 3 is a schematic diagram of a mapping relationship between a first reference signal sequence set and a second reference signal sequence set according to an embodiment.

FIG. 3 is a schematic diagram of a mapping relationship between the first reference signal sequence set and the second reference signal sequence set according to an embodiment. In this embodiment, the numbers of sequences in the two reference signal sequence sets are the same, and sequences in the two reference signal sequence sets satisfy the one-to-one mapping relationship. The sequences in the first reference signal sequence set are non-orthogonal, and the sequences in the second reference signal sequence set are non-orthogonal. As shown in FIG. 3, the number of sequences in the first reference signal sequence set is N, and the length of each sequence is L; and the number of sequences in the second reference signal sequence set is N, and the length of each sequence is K, where N>L>K≥1. The sending end may select a sequence in the first reference signal sequence set as the first reference signal through pre-configuration or random selection for sending, and the serial number of the selected sequence is set as n, where 1≤n≤N. Then the sending end also sends the $n^{th}$ sequence in the second reference signal sequence set as the second reference signal. In addition, the transmission packet also includes transmitted data. In FIG. 3, p1, p2, p3, and p4 to pN represent the sequences in the first reference signal sequence set, and q1, q2, q3, and q4 to qN represent the sequences in the second reference signal sequence set.

Figure 4:
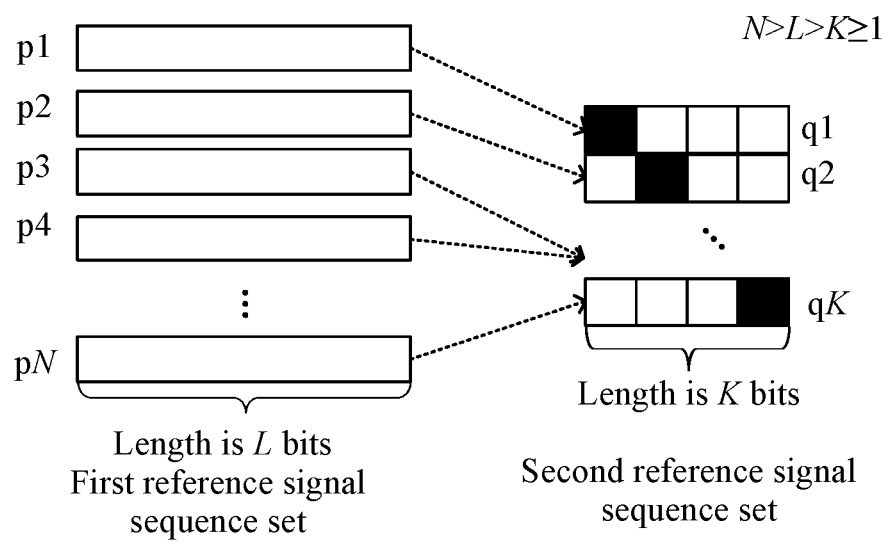
FIG. 4 is a schematic diagram of a mapping relationship between a first reference signal sequence set and a second reference signal sequence set according to another embodiment.

FIG. 4 is a schematic diagram of a mapping relationship between the first reference signal sequence set and the second reference signal sequence set according to another embodiment. In this embodiment, the number of sequences in the first reference signal sequence set is greater than the number of sequences in the second reference signal sequence set, and sequences in the two reference signal sequence sets satisfy the many-to-one mapping relationship. The sequences in the first reference signal sequence set are non-orthogonal, and the sequences in the second reference signal sequence set are orthogonal. As shown in FIG. 4, the number of sequences in the first reference signal sequence set is N, and the length of each sequence is L; and the number of sequences in the second reference signal sequence set is K, and the length of each sequence is K, where N>L>K≥1. The sending end may select a sequence in the first reference signal sequence set as the first reference signal through pre-configuration or random selection for sending, and the serial number of the selected sequence is set as n, where 1≤n≤N. Then the sending end also sends the $(\mathrm{mod}(n-1, K)+1)^{th}$ sequence in the second reference signal sequence set as the second reference signal, where mod is the remainder symbol, and the transmission packet also includes the transmitted data. For example, N=1000, and K=4, if the serial number of the sequence of the first reference signal sent by the sending end is n=34, the serial number of the sequence of the sent second reference signal is 2.

In FIG. 4, p1, p2, p3, and p4 to pN represent the sequences in the first reference signal sequence set, and q1 and q2 to qK represent the sequences in the second reference signal sequence set.

Figure 5:
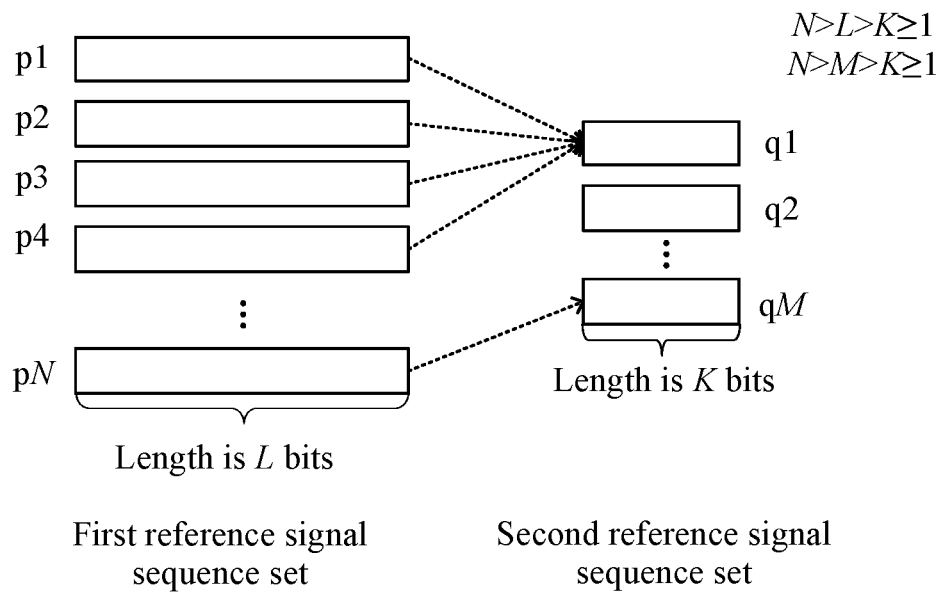
FIG. 5 is a schematic diagram of a mapping relationship between a first reference signal sequence set and a second reference signal sequence set according to another embodiment.

FIG. 5 is a schematic diagram of a mapping relationship between the first reference signal sequence set and the second reference signal sequence set according to another embodiment. In this embodiment, the number of sequences in the first reference signal sequence set is greater than the number of sequences in the second reference signal sequence set, and sequences in the two reference signal sequence sets satisfy the many-to-one mapping relationship. The sequences in the first reference signal sequence set are non-orthogonal, and the sequences in the second reference signal sequence set are non-orthogonal. As shown in FIG. 5, the number of sequences in the first reference signal sequence set is N, and the length of each sequence is L; and the number of sequences in the second reference signal sequence set is M, and the length of each sequence is K, where N>L>K≥1, and N>M>K≥1. The sending end may select a sequence in the first reference signal sequence set as the first reference signal through pre-configuration or random selection for sending, and a serial number of the selected sequence is set as n, where 1≤n≤N. Then the sending end also sends the $\lceil n/\lceil N/M \rceil \rceil^{th}$ sequence in the second reference signal sequence set as the second reference signal, where ⌈⌉ is the upward rounding symbol, and the transmission packet also includes the transmitted data. For example, N=1000, K=16, if the serial number of the sequence of the first reference signal sent by the sending end is n=534, the serial number of the sequence of the sent second reference signal is 9.

In FIG. 5, p1, p2, p3, and p4 to pN represent the sequences in the first reference signal sequence set, and q1 and q2 to qM represent the sequences in the second reference signal sequence set.

Embodiments of the present application further provide a data transmission method applicable to the receiving end, such as a base station. The active sequence in the first reference signal can be efficiently detected according to the second reference signal in the received transmission packet, and the corresponding transmitted data can be accurately processed according to the active sequence in the first reference signal. It is to be noted that for technical details not described in detail in the present embodiment, reference may be made to any one of the preceding embodiments.

Figure 6:
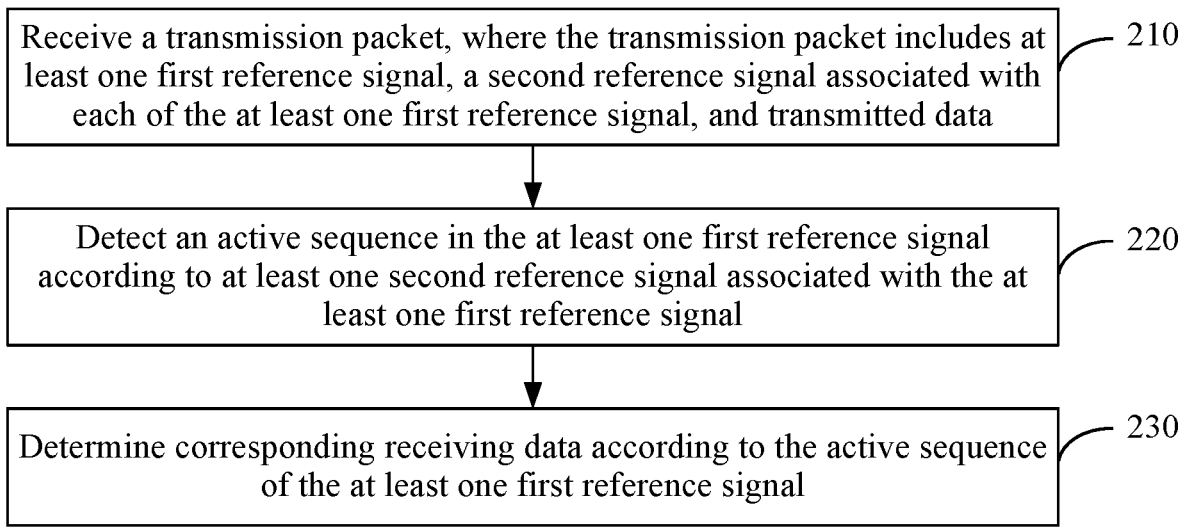
FIG. 6 is a flowchart of a data transmission method according to another embodiment.

FIG. 6 is a flowchart of a data transmission method according to another embodiment. As shown in FIG. 6, the method provided by the present embodiment includes operations 210 to 230.

In operation 210, a transmission packet is received, where the transmission packet includes at least one first reference signal, a second reference signal associated with each first reference signal, and transmitted data.

In operation 220, an active sequence in the at least one first reference signal is detected according to at least one second reference signal associated with the at least one first reference signal.

In operation 230, corresponding receiving data is determined according to the active sequence in the at least one first reference signal.

In this embodiment, the active sequence in the first reference signal can be efficiently detected according to the second reference signal in the received transmission packet, and the corresponding transmitted data can be accurately processed according to the active sequence in the first reference signal. The receiving end may determine a sending end device that can successfully access the network by detecting the active sequence in the first reference signal, and complete the channel estimation or spatial domain combining vector estimation, so that the transmitted data can be accurately processed.

According to the data transmission method in this embodiment, the first reference signal and the second reference signal in the transmission packet have an association relationship, the receiving end can efficiently detect the active sequence in the first reference signal according to the received second reference signal to avoid the iterative calculation, thus reducing the complexity of detecting the first reference signal. On this basis, the corresponding transmitted data can be accurately processed according to the active sequence in the first reference signal, improving the efficiency of data transmission.

In an embodiment, in at least one received transmission packet, the active sequence in at least one first reference signal includes one of the following: at least one sequence in a first reference signal sequence set; at least one sequence with different time domain offsets in a first reference signal sequence set; at least one sequence with different frequency domain offsets in a first reference signal sequence set; or at least one sequence with different time domain offsets and different frequency domain offsets in a first reference signal sequence set.

In an embodiment, the first reference signal sent by each transmitting end is one sequence in the first reference signal sequence set, the second reference signal sent by each transmitting end is one sequence in the second reference signal sequence set, and sequences in the first reference signal sequence set and sequences in the second reference signal sequence set satisfy a many-to-one mapping relationship or a one-to-one mapping relationship, where any one sequence in the first reference signal sequence set is mapped to a unique sequence in the second reference signal sequence set.

In an embodiment, operation 220 includes the following:

In operation 221, an activity degree of a potentially active sequence in the at least one first reference signal is determined according to a signal receiving matrix of the at least one second reference signal.

In operation 222, a set number of potentially active sequences with the highest activity degrees in the first reference signal are taken as the active sequence in the at least one first reference signal.

In this embodiment, in the at least one received transmission packet, the potentially active sequence in the at least one first reference signal includes one of the following: each sequence in the first reference signal sequence set; sequences of each sequence in the first reference signal sequence set at different time domain offsets; sequences of each sequence in the first reference signal sequence set at different frequency domain offsets; or sequences of each sequence in the first reference signal sequence set at different time domain offsets and different frequency domain offsets.

In this embodiment, the transmission packet received by the receiving end may be from one or more sending ends. According to an error between each sequence in the second reference signal sequence set received by the antenna and the ground-truth second reference signal, it may be determined which second reference signal or which second reference signals can be effectively recovered, and a first reference signal associated with the second reference signal which can be effectively recovered is the active sequence in the first reference signal. According to the active sequence in the first reference signal, the channel estimation or the spatial domain combining vector estimation can be completed, and the transmitted data can be accurately processed. The smaller the error between the received second reference signal and the ground-truth second reference signal is, the higher the activity degree of the first reference signal associated with the second reference signal is. In the ideal condition (no noise and no interference), for an active pilot, the ground-truth second reference signal can be recovered with an error of 0, while for an inactive pilot, the ground-truth second reference signal cannot be recovered.

The active sequence in the first reference signal may refer to a first reference signal with a calculated error less than or equal to a set threshold, or a first reference signal with a calculated activity degree greater than or equal to a set threshold, or a set number of first reference signals with the minimum error (or the maximum activity degree).

In an embodiment, operation 221 includes performing the following operations on each first reference signal: calculating a spatial domain combining vector corresponding to a potentially active sequence in each first reference signal; combining the spatial domain combining vector with a signal receiving matrix of a corresponding second reference signal to obtain a combining result, where the spatial domain combining vector corresponds to the second reference signal; and calculating a Euclidean distance between the combining result and a sequence of the corresponding second reference signal in the second reference signal sequence set, where the Euclidean distance is negatively correlated with the activity degree.

In this embodiment, for each potentially active sequence (which may be a sequence in the first reference signal sequence set or one of the sequences in the first reference signal sequence set at different time domain offsets and/or different frequency domain offsets) in the first reference signal, the corresponding spatial domain combining vector is calculated respectively, where the spatial domain combining vector is a weight vector used for combining received signals of multiple receiving antennas. Then, each spatial domain combining vector is respectively combined with the sequence of the corresponding second reference signal in the second reference signal sequence set to obtain a combining result, and the Euclidean distance between each combining result and the corresponding ground-truth sequence of the second reference signal is calculated. The larger the Euclidean distance is, the larger the error is, and the smaller the activity degree is.

The sequence of the second reference signal may be a sequence in the second reference signal sequence set or each of the sequences in the second reference signal sequence set at different time domain and/or frequency domain offsets. Each active sequence in the first reference signal sequence set is associated with one unique sequence of the second reference signal, and the sequence of the first reference signal and the sequence of the second reference signal satisfy a one-to-one mapping relationship or a many-to-one mapping relationship. The mapping relationship is not limited in this embodiment.

In an embodiment, the length of the first reference signal is greater than the length of the second reference signal.

In an embodiment, the number of sequences in the first reference signal sequence set is greater than or equal to the number of sequences in the second reference signal sequence set.

In an embodiment, the sequences in the second reference signal sequence set are orthogonal, and the second reference signal sequence set is one of the following: a Hadamard sequence, a set of row vectors in a diagonal matrix, or a set of row vectors in a DFT matrix.

In an embodiment, the sequences in the second reference signal sequence set are non-orthogonal, and the sequences in the second reference signal sequence set are one of the following: ETF sequences, MUSA sequences or sequences generated based on a complex Gaussian random number.

In an embodiment, the first reference signal includes at least one of a preamble signal, a pilot signal or a DMRS.

In an embodiment, the mapping relationship between the sequences in the first reference signal sequence set and the sequences in the second reference signal sequence set satisfies one of the following:
   an $n^{th}$ sequence in the first reference signal sequence set is associated with an $n^{th}$ sequence in the second reference signal sequence set, where n is a positive integer;
   an $n^{th}$ sequence in the first reference signal sequence set is associated with a $(mod(n-1, K)+1)$th sequence in the second reference signal sequence set, where n is a positive integer, K is the number of sequences in the second reference signal sequence set, and K is a positive integer; or
   an $n^{th}$ sequence in the first reference signal sequence set is associated with a $\lceil n/\lceil N/M \rceil \rceil^{th}$ sequence in the second reference signal sequence set, where n is a positive integer, M is the number of sequences in the second reference signal sequence set, M is a positive integer, N is the number of sequences in the first reference signal sequence set, and N is a positive integer.

Figure 7:
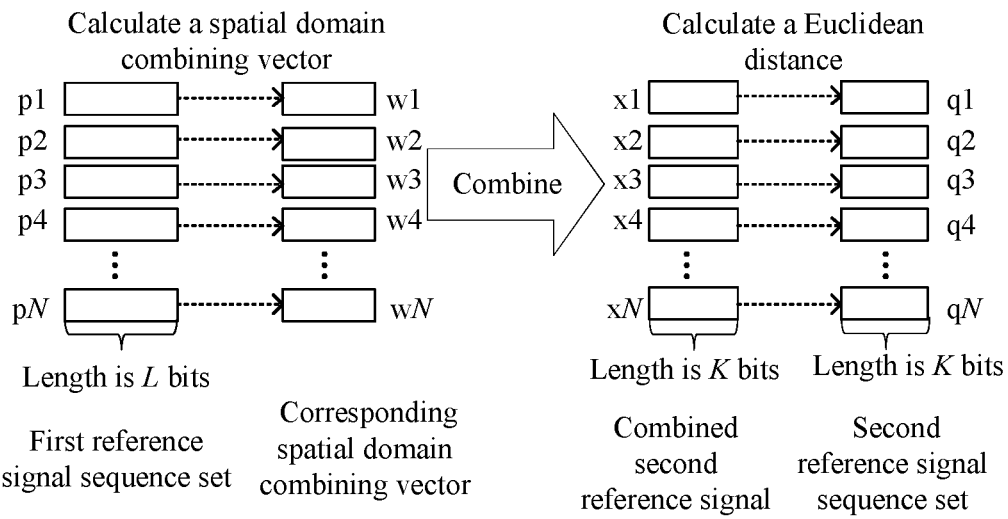
FIG. 7 is a schematic diagram of detecting an active sequence in a first reference signal according to an embodiment.

FIG. 7 is a schematic diagram of detecting an active sequence in a first reference signal according to an embodiment.

In this embodiment, the sequences in the second reference signal sequence set and the sequences in the second reference signal sequence set are non-orthogonal, the numbers of sequences in the two reference signal sequence sets are the same, and sequences in the two reference signal sequence sets satisfy the one-to-one mapping relationship. As shown in FIG. 7, the number of sequences (i.e. potentially active sequences in the first reference signal) in the first reference signal sequence set is N, the length of each sequence is L, and the N sequences in the first reference signal sequence set are respectively represented as p1 to pN. The number of sequences in the second reference signal sequence set is N, the length of each sequence is K, where N>L>K≥1, and the N sequences in the second reference signal sequence set are respectively represented as q1 to qN.

The receiving end calculates the activity degrees of all pilots (the first reference signals). The method is as follows: (1) respectively calculating N spatial domain combining vectors corresponding to N first reference signals, which are respectively represented as w1 to wN; (2) respectively combining the N spatial domain combining vectors with signal receiving matrices of the corresponding second reference signals, where the N combined second reference signals are represented as x1 to xN, respectively; (3) for an $n^{th}$ combined signal, calculating a Euclidean distance between the $n^{th}$ combined signal and the $n^{th}$ sequence in the second reference signal sequence set, where 1≤n≤N; and (4) using the Euclidean distance between the $n^{th}$ combined signal and the $n^{th}$ sequence qn in the second reference signal sequence set as a basis for determining the activity degree of an $n^{th}$ first reference signal. The smaller the Euclidean distance is, the higher the activity degree is. A set number of first reference signals having the activity degrees greater than a certain threshold are determined as the active sequences in the first reference signal, and the transmitted data is received accordingly.

In an embodiment, during the process of calculating the activity degree, the spatial domain combining vectors are calculated first logically, and then signals obtained by respectively combining the spatial domain combining vectors with the sequences of the corresponding second reference signals are calculated, and this process may be represented by multiplication of two successive matrices, $P \cdot Y^{-1} \cdot Y_R$, where P is an N×L matrix composed of the sequences of the first reference signals, Y is an $M_0 \times L$ signal receiving matrix of the first reference signals, $P \cdot Y^{-1}$ is a matrix composed of N spatial domain combining vectors, $Y_R$ is an $M_0 \times K$ signal receiving matrix of the second reference signals, and $M_0$ is the number of receiving antennas. In a practical application, since the value of N is relatively large, great complexity may be caused by calculating $P \cdot Y^{-1}$ first, while K is relatively small, only one bit is required in minimum, therefore, $Y^{-1} \cdot Y_R$ may be calculated first, and then $P \cdot (Y^{-1} \cdot Y_R)$ may be calculated, which can further reduce the computational complexity, simplify the complex multiplication of $N \times M_0 \times L$ into the complex multiplication of $N \times M_0 \times K$, and improve the detection efficiency of the first reference signal and the efficiency of data transmission.

Figure 8:
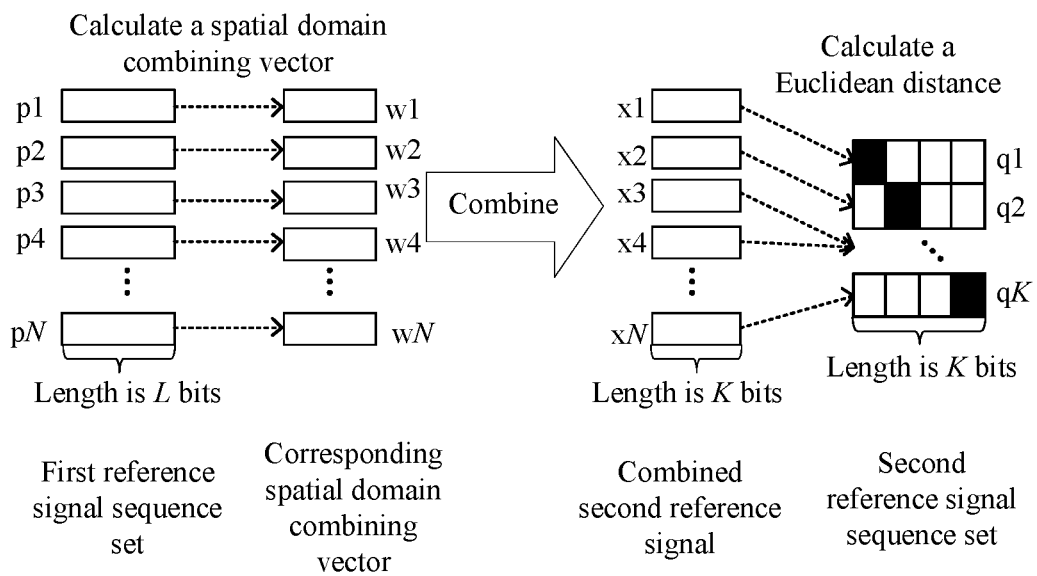
FIG. 8 is a schematic diagram of detecting an active sequence in a first reference signal according to another embodiment.

FIG. 8 is a schematic diagram of detecting an active sequence in a first reference signal according to another embodiment.

In this embodiment, the sequences in the first reference signal sequence set are non-orthogonal, the sequences in the second reference signal sequence set are orthogonal, the number of sequences in the first reference signal sequence set is greater than the number of sequences in the second reference signal sequence set, and sequences in the two reference signal sequence sets satisfy the many-to-one mapping relationship. As shown in FIG. 8, the number of sequences (i.e., potentially active sequences in the first reference signals) in the first reference signal sequence set is N, the length of each sequence is L, and N sequences are respectively represented as p1 to pN. The number of sequences in the second reference signal sequence set is K, the length of each sequence is K, where N>L>K≥1, and K sequences are respectively represented as q1 to qK.

The receiving end calculates the activity degrees of all pilots (the first reference signals). The method is as follows: (1) respectively calculating spatial domain combining vectors corresponding to N first reference signals, which are respectively represented as w1 to wN; (2) respectively combining the N spatial domain combining vectors with signal receiving matrices of the corresponding second reference signals, where the signal receiving matrices of N second reference signals are respectively represented as x1 to xN; (3) for an $n^{th}$ combined signal, calculating a Euclidean distance between the $n^{th}$ combined signal and a $(\bmod (n-1, K)+1)^{th}$ sequence in the second reference signal sequence set, where $1 \leq n \leq N$; and (4) using the Euclidean distance between the $n^{th}$ combined signal and the $(\bmod(n-1, K)+1)^{th}$ sequence in the second reference signal sequence set as a basis for determining the activity degree of the $n^{th}$ first reference signal. The smaller the Euclidean distance is, the higher the activity degree is. A set number of first reference signals with the activity degrees greater than a certain threshold are determined as the active sequences in the first reference signals, and the transmitted data is received accordingly.

For example, N=1000 and K=4, for an $n^{th}$ (n=57) combined signal, the Euclidean distance between the 57th combined signal and the sequence of the second reference signal with the serial number of 1 is calculated as a basis for determining whether the $n^{th}$ (n=57) first reference signal is active.

In the process of calculating the activity degree, $P \cdot Y^{-1}$ is logically calculated first, and then $(P \cdot Y^{-1}) \cdot Y_R$ is calculated; alternatively, in the practical application, $Y^{-1} \cdot Y_R$ may be calculated first, and then $P \cdot (Y^{-1} \cdot Y_R)$ is calculated, so as to further reduce the calculation complexity, and improve the detection efficiency of the first reference signal and the efficiency of data transmission.

Figure 9:
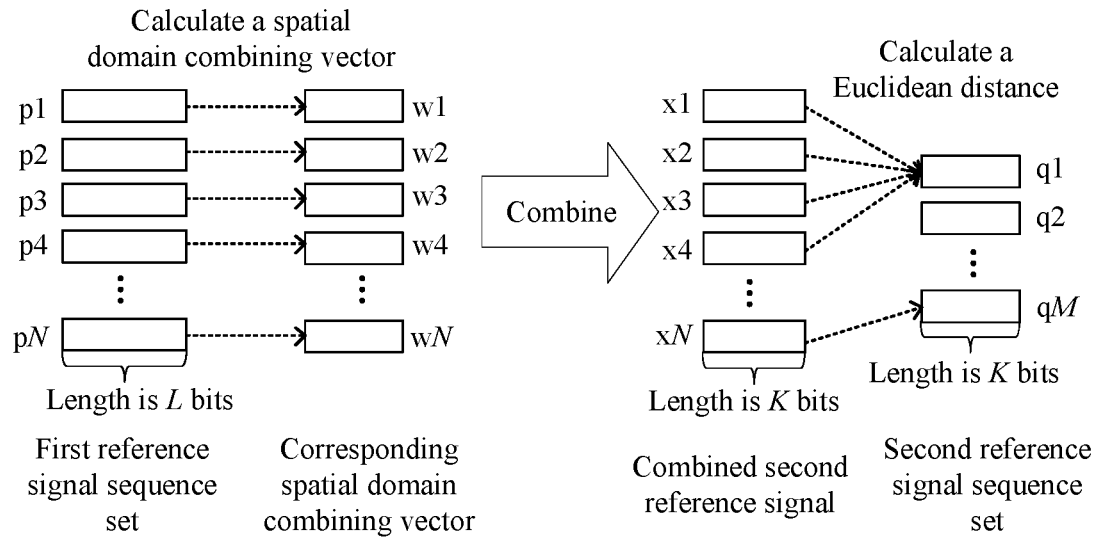
FIG. 9 is a schematic diagram of detecting an active sequence in a first reference signal according to another embodiment.

FIG. 9 is a schematic diagram of detecting an active sequence in a first reference signal according to another embodiment.

In this embodiment, the sequences in the first reference signal sequence set and the sequences in the second reference signal sequence set are non-orthogonal, the number of sequences in the first reference signal sequence set is greater than the number of sequences in the second reference signal sequence set, and sequences in the two reference signal sequence sets satisfy the many-to-one mapping relationship. As shown in FIG. 9, the number of sequences (i.e. potentially active sequences in the first reference signals) in the first reference signal sequence set is N, the length of each sequence is L, and N sequences are respectively represented as p1 to pN. The number of sequences in the second reference signal sequence set is M, the length of each sequence is K, where N>L>K≥1, and N>M>K≥1, and M sequences are respectively represented as q1 to qM.

The receiving end calculates the activity degrees of all pilots (the first reference signals). The method is as follows: (1) respectively calculating spatial domain combining vectors corresponding to N first reference signals, which are respectively represented as w1 to wN; (2) respectively combining the N spatial domain combining vectors with signal receiving matrices of the corresponding second reference signals, where the signal receiving matrices of N second reference signals are respectively represented as x1 to xN; (3) for an $n^{th}$ combined signal, calculating a Euclidean distance between the $n^{th}$ combined signal and a $\lceil n/\lceil N/M \rceil \rceil^{th}$ sequence in the second reference signal sequence set, where $1 \leq n \leq N$; and (4) using the Euclidean distance between the $n^{th}$ combined signal and the $\lceil n/\lceil N/M \rceil \rceil^{th}$ sequence in the second reference signal sequence set as a basis for determining the activity degree of the $n^{th}$ first reference signal. The smaller the Euclidean distance is, the higher the activity degree is. A set number of first reference signals with the activity degrees greater than a certain threshold are determined as the active sequences in the first reference signals, and the transmitted data is received accordingly.

For example, N=1000 and M=16, for an $n^{th}$ (n=375) combined signal, the Euclidean distance between the 375$^{th}$ combined signal and the sequence of the second reference signal with the serial number of 6 is calculated as a basis for determining whether the $n^{th}$ (n=375) first reference signal is active.

In the process of calculating the activity degree, $P \cdot Y^{-1}$ is logically calculated first, and then $(P \cdot Y^{-1}) \cdot Y_R$ is calculated; alternatively, in the practical application, $Y^{-1} \cdot Y_R$ may be calculated first, and then $P \cdot (Y^{-1} \cdot Y_R)$ is calculated, so as to further reduce the calculation complexity, and improve the detection efficiency of the first reference signals and the efficiency of data transmission.

Figure 10:
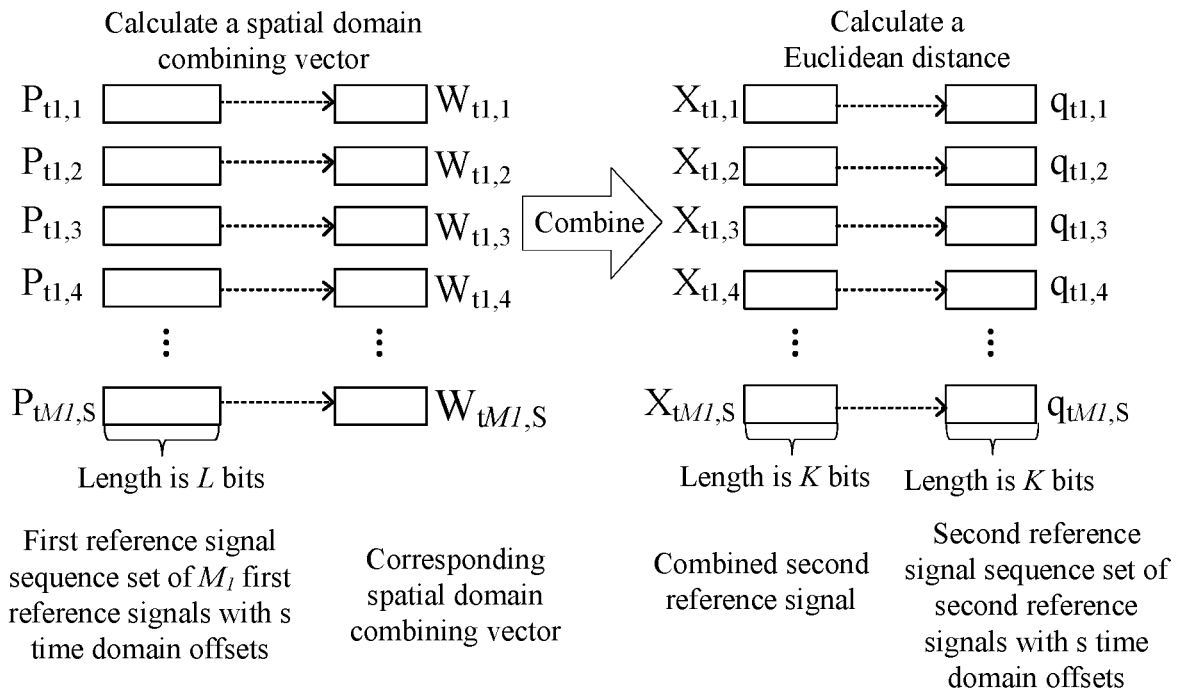
FIG. 10 is a schematic diagram of detecting an active first reference signal with a time or frequency domain offset according to an embodiment.

FIG. 10 is a schematic diagram of detecting an active first reference signal with a time or frequency domain offset according to an embodiment.

In this embodiment, since the sequence may be distorted or deformed after experiencing the time domain offset or the frequency domain offset of the channel, the time or frequency domain offset estimation also requires to be performed in the process of detecting the active sequences in the first reference signals at the receiving end. The sequence of the first reference signal is represented as p, and the sequence of the second reference signal associated with the first reference signal is represented as q. When the time domain offset is considered, it is assumed that s time domain offset scales may satisfy a resolution requirement for estimating the time domain offset.

For example, the number of sequences in the first reference signal sequence set and the number of sequences in the second reference signal sequence set are the same (both are N), and the sequences in the two reference signal sequence sets satisfy the one-to-one mapping relationship.

As shown in FIG. 10, one implementation is that the receiving end first detects the active sequences in $M_1$ first reference signals by adopting the method of any embodiment, and the serial numbers of the active sequences are respectively represented as t1 to $tM_1$, where $M_1$ is a positive integer. By utilizing s (s is a positive integer) time domain offset scales, the sequences of $M_1$ first reference signals are expanded into s portions, respectively, each portion corresponds to a different time domain offset, and $s \times M_1$ sequences, with time domain offsets, of the first reference signals are obtained and represented as $p_{t1,1}$ to $p_{t1,s}$, $p_{t2,1}$ to $p_{t2,s}$, $p_{t3,1}$ to $p_{t3,s}$ ... $p_{tM1,1}$ to $p_{tM1,s}$, respectively. Similarly, by utilizing s time domain offset scales, $M_1$ corresponding sequences in the second reference signal sequence set are respectively expanded into s portions, each portion corresponds to a different time domain offset, and $s \times M_1$ sequences, with the time domain offsets, of the second reference signals are obtained and represented as $q_{t1,1}$ to $q_{t1,s}$, $q_{t2,1}$ to $q_{t2,s}$, $q_{t3,1}$ to $q_{t3,s}$ ... $q_{tM1,1}$ to $q_{tM1,s}$, respectively. The signal receiving matrix of each sequence, with the time domain offset, of the second reference signals is represented as $x_{t1,1}$ to $x_{t1,s}$, $x_{t2,1}$ to $x_{t2,s}$, $x_{t3,1}$ to $x_{t3,s}$ ... $x_{tM1,1}$ to $x_{tM1,s}$, respectively.

The receiving end calculates the spatial domain combining vector (respectively represented as $w_{t1,1}$ to $w_{t1,s}$, $w_{t2,1}$ to $w_{t2,s}$, $w_{t3,1}$ to $w_{t3,s}$ ... $w_{tM1,1}$ to $w_{tM1,s}$) of each sequence, with the time domain offset, of the first reference signal, combines each spatial domain combining vector with a signal receiving matrix of the corresponding second reference signal with the time domain offset, and calculates a Euclidean distance between each combined signal and the ground-truth sequence, with the time domain offset, of the second reference signal. Each Euclidean distance is used as the basis for determining the activity degree of the corresponding sequence, with the time domain offset, of the first reference signal, and the smaller the Euclidean distance is, the higher the activity degree is. The sequences of the first reference signals whose activity degree is greater than a certain threshold are determined as the active sequences in the first reference signals at the receiving end, and the corresponding time domain offset is also acquired through the calculation, so that the transmitted data can be accurately processed. If the number of determined active sequences in the first reference signals received by the receiving end is $M_1$, the number of finally-determined active sequences with the time domain offsets in the first reference signal sequence set is $M_1$, where each sequence in the first reference signal sequence set appears at most once, that is, each sequence in the first reference signal sequence set corresponds to s time domain offsets. If one of the sequences is determined to be an active sequence at a certain time domain offset, the same sequence is an inactive sequence at other (s–1) time domain offsets. On this basis, the receiving end can accurately process the transmitted data.

Another implementation includes the following: the receiving end first calculates the active degree of each sequence, with the time domain offset, of the first reference signal, acquires the time domain offset for the active sequences, with the time domain offsets, of the first reference signal, and then detects the active sequences of $M_1$ first reference signals by adopting the method of any one of the preceding embodiments. In an embodiment, by using s (s is a positive integer) time domain offset scales, all sequences, with the time domain offsets, of the first reference signals are divided into s portions, respectively, each portion corresponds to a different time domain offset, and $s \times N$ sequences, with the time domain offsets, of the first reference signals are obtained in total and respectively represented as $p_{t1,1}$ to $p_{t1,s}$, $p_{t2,1}$ to $p_{t2,s}$, $p_{t3,1}$ to $p_{t3,s}$ ... $p_{tN,1}$ to $p_{tN,s}$. Similarly, by using s time domain offset scales, N sequences in the corresponding second reference signal sequence set are respectively expanded into s portions, each portion corresponds to a different time domain offset, and $s \times N$ sequences, with the time domain offsets, of the second reference signals are obtained and respectively represented as $q_{t1,1}$ to $q_{t1,s}$, $q_{t2,1}$ to $q_{t2,s}$, $q_{t3,1}$ to $q_{t3,s}$ ... $q_{tN,1}$ to $q_{tN,s}$. The signal receiving matrix of each sequence, with the time domain offset, of the second reference signals is represented as $x_{t1,1}$ to $x_{t1,s}$, $x_{t2,1}$ to $x_{t2,s}$, $x_{t3,1}$ to $x_{t3,s}$ ... $x_{tN,1}$ to $x_{tN,s}$, respectively.

The receiving end calculates the spatial domain combining vector (respectively represented as $w_{t1,1}$ to $w_{t1,s}$, $w_{t2,1}$ to $w_{t2,s}$, $w_{t3,1}$ to $w_{t3,s}$ ... $w_{tN,1}$ to $w_{tN,s}$ of each sequence, with the time domain offset, of the first reference signal, combines each spatial domain combining vector with a signal receiving matrix of the corresponding second reference signal with the time domain offset, and calculates the Euclidean distance between each combined signal and the ground-truth sequence, with the time domain offset, of the second reference signal. Each Euclidean distance is used as the basis for determining the activity degree of the corresponding sequence, with the time domain offset, of the first reference signal, and the smaller the Euclidean distance is, the higher the activity degree is. The sequences, with the time domain offsets, of a set number (such as $\alpha_2$) of first reference signals whose activity degrees are greater than a certain threshold are determined as the active sequences in the first reference signal sequence set, and the time domain offset for the active sequences, with the time domain offsets, of the first reference signals is also acquired through the calculation. On this basis, the receiving end may adopt the method of any embodiment to further detect $M_1$ active sequences in the first reference signals from the active sequences, with the time domain offsets, of the first reference signals, and the serial numbers of the $M_1$ active sequences are respectively represented as t1 to $tM_1$, where $M_1$ is a positive integer. If the number of active sequences of the first reference signals which are initially determined and have the time domain offsets is $M_1$, the number of active sequences in the first reference signal sequence set which are finally determined and have the time domain offsets is also $M_1$, where each sequence in the first reference signal sequence set appears at most once, so the transmitted data can be accurately processed.

The two implementations of detecting the active first reference signals with the time domain offset are applicable to the cases in which the numbers of sequences in the two reference signal sequence sets are not equal, sequences in the two reference signal sequence sets satisfy the many-to-one mapping relationship, the sequences in the second reference signal sequence set are orthogonal or non-orthogonal, and the first reference signals have the frequency domain offsets or the time domain offsets and frequency domain offsets.

For example, the number of sequences in the first reference signal sequence set is N, the number of sequences in the second reference signal sequence set is M, and N≥M By using s (s is a positive integer) time domain offset scales, $s \times N$ sequences (i.e., potentially active sequences in the first reference signals), with time domain offsets, of the first reference signals are obtained and respectively represented as $p_{t1,1}$ to $p_{t1,s}$, $p_{t2,1}$ to $p_{t2,s}$, $p_{t3,1}$ to $p_{t3,s}$ ... $p_{tN,1}$ to $p_{tN,s}$. Similarly, by using s time domain offset scales, M sequences in the corresponding second reference signal sequence set are expanded into s portions, respectively, each portion corresponds to a different time domain offset, and $s \times M$ sequences with the time domain offsets of the second reference signals are obtained and respectively represented as $q_{t1,1}$ to $q_{t1,s}$, $q_{t2,1}$ to $q_{t2,s}$, $q_{t3,1}$ to $q_{t3,s}$ ... $q_{tM1,1}$ to $q_{tM1,s}$. The signal receiving matrix of each sequence, with the time domain offset, of the second reference signal is represented as $x_{t1,1}$ to $x_{t1,s}$, $x_{t2,1}$ to $x_{t2,s}$, $x_{t3,1}$ to $x_{t3,s}$ ... $x_{tN,1}$ to $x_{tN,s}$, respectively, and the spatial domain combining vector of each sequence, with the time domain offset, of the first reference signals is respectively represented as $w_{t1,1}$ to $w_{t1,s}$, $w_{t2,1}$ to $w_{t2,s}$, $w_{t3,1}$ to $w_{t3,s}$ ... $w_{tN,1}$ to $w_{tN,s}$.

For another example, the number of sequences in the first reference signal sequence set is N, the number of sequences in the second reference signal sequence set is M, and N≥M. By using $s_1$ ($s_1$ is a positive integer) frequency domain offset scales, $s_1 \times N$ sequences (i.e., potentially active sequences in the first reference signals), with frequency domain offsets, of the first reference signals are obtained and respectively represented as $p_{t1,1}$ to $p_{t1,s1}$, $p_{t2,1}$ to $p_{t2,s1}$, $p_{t3,1}$ to $p_{t3,s1}$ ... $p_{tN,1}$ to $p_{tN,s1}$. Similarly, by using $s_1$ frequency domain offset scales, M sequences in the corresponding second reference signal sequence set are respectively expanded into $s_1$ portions, each portion corresponds to a different frequency domain offset, and $s_1 \times M$ sequences of the second reference signals with the frequency domain offsets are obtained and respectively represented as $q_{t1,1}$ to $q_{t1,s1}$, $q_{t2,1}$ to $q_{t2,s1}$, $q_{t3,1}$ to $q_{t3,s1}$ ... $q_{tN,1}$ to $q_{tN,s1}$. The signal receiving matrix of each sequence, with the frequency domain offset, of the second reference signals is represented as $x_{t1,1}$ to $x_{t1,s1}$, $x_{t2,1}$ to $x_{t2,s1}$, $x_{t3,1}$ to $x_{t3,s1}$ ... $x_{tN,1}$ to $x_{tN,s1}$, respectively, and the spatial domain combining vector of each sequence, with the frequency domain offset, of the first reference signals is represented as $w_{t1,1}$ to $w_{t1,s1}$, $w_{t2,1}$ to $w_{t2,s1}$, $w_{t3,1}$ to $w_{t3,s1}$ ... $w_{tN,1}$ to $w_{tN,s1}$, respectively.

For another example, the number of sequences in the first reference signal sequence set is N, the number of sequences in the second reference signal sequence set is M, and N≥M By using $s_2$ ($s_2$ is a positive integer) time domain offset scales and $s_3$ ($s_3$ is a positive integer) frequency domain offset scales, $s_2 \times s_3 \times N$ sequences (i.e., potentially active sequences in the first reference signals), with the time domain offsets and frequency domain offsets, of the first reference signals are obtained and respectively represented as $p_{t1,1,1}$ to $p_{t1,s2,s3}$, $p_{t2,1,1}$ to $p_{t2,s2,s3}$, $p_{t3,1,1}$ to $p_{t3,s2,s3}$ ... $p_{tN,1,1}$ to $p_{tN,s2,s3}$. Similarly, by using $s_2$ time domain offset scales and $s_3$ frequency domain offset scales, M sequences in the corresponding second reference signal sequence set are respectively expanded into $s_2 \times s_3$ portions, each portion corresponds to a different time domain offset and a different frequency domain offset, and $s_2 \times s_3 \times M$ sequences, with the time domain offsets and the frequency domain offsets, of the second reference signals are obtained and respectively represented as $q_{t1,1,1}$ to $q_{t1,s2,s3}$, $q_{t2,1}$ to $q_{t2,s}$, $q_{t3,1,1}$ to $q_{t3,s2,s3}$ ... $q_{tM,1,1}$ to $q_{tM,s2,s3}$. The signal receiving matrix of each sequence, with the time domain offset and the frequency domain offset, of the second reference signals is represented as $x_{t1,1,1}$ to $x_{t1,s2,s3}$, $x_{t2,1,1}$ to $x_{t2,s2,s3}$, $x_{t3,1,1}$ to $x_{t3,s2,s3}$ ... $x_{tN,1,1}$ to $x_{tN,s2,s3}$, respectively, and the spatial domain combining vector of each sequence, with the time domain offset and frequency domain offset, of the first reference signals is represented as $w_{t1,1,1}$ to $w_{t1,s2,s3}$, $w_{t2,1,1}$ to $w_{t2,s2,s3}$, $w_{t3,1,1}$ to $w_{t3,s2,s3}$ ... $w_{tN,1,1}$ to $w_{tN,s2,s3}$.

In a case where N≥M, if the sequences in the second reference signal sequence set are orthogonal (M=K, where K is the length of each sequence of the second reference signal), the $n^{th}$ sequence in the first reference signal sequence set is associated with the $(\mod(n-1, K)+1)^{th}$ sequence in the second reference signal sequence set, and calculating the Euclidean distance is to calculate the Euclidean distance between the $n^{th}$ combined signal and the $(\mod(n-1, K)+1)^{th}$ sequence in the second reference signal sequence set. If the sequences in the second reference signal sequence set are non-orthogonal, the $n^{th}$ sequence in the first reference signal sequence set is associated with the $\lceil n/\lceil N/M \rceil \rceil^{th}$ sequence in the second reference signal sequence set, and calculating the Euclidean distance is to calculate the Euclidean distance between the $n^{th}$ combined signal and the $\lceil n/\lceil N/M \rceil \rceil^{th}$ sequence in the second reference signal sequence set.

In the data transmission method of this embodiment, a scheme for detecting a sequence in at least one first reference signal sequence set (which may be a sequence in the first reference signal sequence set or a sequence with the time domain offset and/or the frequency domain offset) is provided, thus improving the flexibility and reliability of detecting the active sequence in the first reference signal, and further improving the efficiency of detecting the active sequence in the first reference signal, thereby improving the efficiency of data transmission.

Figure 11:
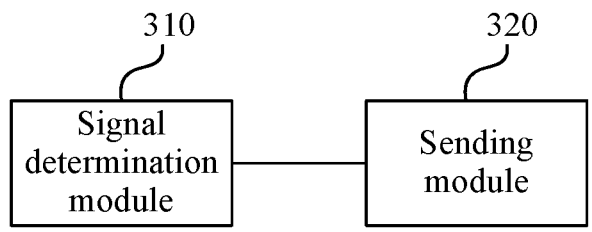
FIG. 11 is a structural diagram of a data transmission apparatus according to an embodiment.

Embodiments of the present application further provide a data transmission apparatus. FIG. 11 is a structural diagram of a data transmission apparatus according to an embodiment. As shown in FIG. 11, the data transmission apparatus includes a signal determination module 310 and a sending module 320.

The signal determination module 310 is configured to determine a first reference signal and a second reference signal associated with the first reference signal, where the second reference signal is used for assisting a receiving end in detecting an active sequence in at least one received first reference signal.

The sending module 320 is configured to send a transmission packet, where the transmission packet includes the first reference signal, the second reference signal and transmitted data.

According to the data transmission apparatus in this embodiment, the sent transmission packet includes the first reference signal and the transmitted data, and the second reference signal is added to the transmission packet so as to assist the receiving end in efficiently detecting the active sequence in the first reference signal in the received signal and to avoid the iterative calculation, thereby reducing the complexity of detecting the first reference signal. On this basis, the sending end can receive the transmitted data according to the detected first reference signal, thereby improving the data transmission efficiency.

In an embodiment, in the at least one transmission packet received by the receiving end, the active sequence in the first reference signal includes one of the following: at least one sequence in a first reference signal sequence set; at least one sequence with different time domain offsets in a first reference signal sequence set; at least one sequence with different frequency domain offsets in a first reference signal sequence set; or at least one sequence with different time domain offsets and different frequency domain offsets in a first reference signal sequence set.

In an embodiment, the first reference signal is one sequence in the first reference signal sequence set, and the second reference signal is one sequence in the second reference signal sequence set.

Sequences in the first reference signal sequence set and sequences in the second reference signal sequence set satisfy a many-to-one mapping relationship or a one-to-one mapping relationship, where any one sequence in the first reference signal sequence set is mapped to a unique sequence in the second reference signal sequence set.

In an embodiment, the length of the first reference signal is greater than the length of the second reference signal.

In an embodiment, the number of sequences in the first reference signal sequence set is greater than or equal to the number of sequences in the second reference signal sequence set.

In an embodiment, the sequences in the second reference signal sequence set are orthogonal. The second reference signal sequence set is one of the following: a Hadamard sequence, a set of row vectors in a diagonal matrix, or a set of row vectors in a Discrete Fourier Transform (DFT) matrix.

In an embodiment, the sequences in the second reference signal sequence set are non-orthogonal. The sequences in the second reference signal sequence set are one of the following: ETF sequences, MUSA sequences, or sequences generated based on a complex Gaussian random number.

In an embodiment, the first reference signal includes at least one of a preamble signal, a pilot signal or a DMRS.

In an embodiment, the mapping relationship between the sequences in the first reference signal sequence set and the sequences in the second reference signal sequence set satisfies one of the following:
- an $n^{th}$ sequence in the first reference signal sequence set is associated with an $n^{th}$ sequence in the second reference signal sequence set, where n is a positive integer;
- an $n^{th}$ sequence in the first reference signal sequence set is associated with an $x^{th}$ sequence in the second reference signal sequence set, where n is a positive integer, K is the number of sequences in the second reference signal sequence set, K is a positive integer, and x is mod(n−1, K)+1; or
- an $n^{th}$ sequence in the first reference signal sequence set is associated with a $\lceil n/\lceil N/M \rceil \rceil^{th}$ sequence in the second reference signal sequence set, where n is a positive integer, M is the number of sequences in the second reference signal sequence set, M is a positive integer, N is the number of sequences in the first reference signal sequence set, and N is a positive integer.

The data transmission apparatus provided in this embodiment and the data transmission method provided in the preceding embodiments belong to the same concept. For technical details not described in detail in this embodiment, reference may be made to any one of the preceding embodiments. The present embodiment has the same beneficial effects as the performed data transmission method.

Figure 12:
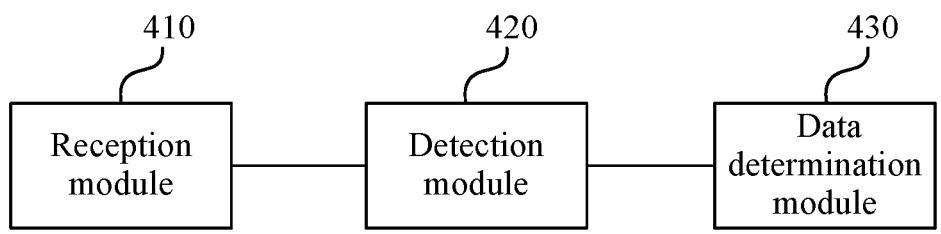
FIG. 12 is a structural diagram of a data transmission apparatus according to another embodiment.

Embodiments of the present application further provide a data transmission apparatus. FIG. 12 is a structural diagram of a data transmission apparatus according to another embodiment. As shown in FIG. 12, the data transmission apparatus includes a reception module 410, a detection module 420 and a data determination module 430.

The reception module 410 is configured to receive a transmission packet, where the transmission packet includes at least one first reference signal, a second reference signal associated with each of the at least one first reference signal, and transmitted data.

The detection module 420 is configured to detect an active sequence in the at least one first reference signal according to at least one second reference signal associated with the at least one first reference signal.

The data determination module 430 is configured to determine corresponding receiving data according to the active sequence in the at least one first reference signal.

According to the data transmission apparatus in this embodiment, the first reference signal and the second reference signal in the transmission packet have an association relationship, the active sequence in the first reference signal can be efficiently detected according to the received second reference signal, avoiding the iterative calculation, thus reducing the complexity of detecting the first reference signal. On this basis, the corresponding transmitted data can be accurately processed according to the active sequence in the first reference signal, thereby improving the efficiency of data transmission.

In an embodiment, in the at least one received transmission packet, the active sequence in at least one first reference signal includes one of the following: at least one sequence in a first reference signal sequence set; at least one sequence with different time domain offsets in a first reference signal sequence set; at least one sequence with different frequency domain offsets in a first reference signal sequence set; or at least one sequence with different time domain offsets and different frequency domain offsets in a first reference signal sequence set.

In an embodiment, the first reference signal sent by each transmitting end is one sequence in a first reference signal sequence set, and a second reference signal sent by each transmitting end is one sequence in a second reference signal sequence set.

Sequences in the first reference signal sequence set and sequences in the second reference signal sequence set satisfy a many-to-one mapping relationship or a one-to-one mapping relationship, where any one sequence in the first reference signal sequence set is mapped to a unique sequence in the second reference signal sequence set.

In an embodiment, the detection module 420 includes an activity degree determination unit and an active reference signal determination unit.

The activity degree determination unit is configured to determine an activity degree of a potentially active sequence in the at least one first reference signal according to a signal receiving matrix of the at least one second reference signal.

The active reference signal determination unit is configured to take a set number of potentially active sequences with the highest activity degrees in the at least one first reference signal as the active sequence in the at least one first reference signal.

In the at least one received transmission packet, the potentially active sequence in the at least one first reference signal includes one of the following: each sequence in the first reference signal sequence set; sequences of each sequence in the first reference signal sequence set at different time domain offsets; sequences of each sequence in the first reference signal sequence set at different frequency domain offsets; or sequences of each sequence in the first reference signal sequence set at different time domain offsets and different frequency domain offsets.

In an embodiment, the activity degree determination unit is further configured to perform the following operations on each first reference signal: calculating a spatial domain merging vector corresponding to a potentially active sequence in each first reference signal; combining each spatial domain combining vector with a signal receiving matrix of a corresponding second reference signal to obtain a combining result, where the spatial domain combining vector corresponds to the second reference signal; and calculating a Euclidean distance between the combining result and a sequence of the corresponding second reference signal in the second reference signal sequence set, where the Euclidean distance is negatively correlated with the activity degree.

In an embodiment, the length of the first reference signal is greater than the length of the second reference signal.

In an embodiment, the number of sequences in the first reference signal sequence set is greater than or equal to the number of sequences in the second reference signal sequence set.

In an embodiment, the sequences in the second reference signal sequence set are orthogonal. The second reference signal sequence set is one of the following: a Hadamard sequence, a set of row vectors in a diagonal matrix, or a set of row vectors in a DFT matrix.

In an embodiment, the sequences in the second reference signal sequence set are non-orthogonal. The sequences in the second reference signal sequence set are one of the following: ETF sequences, MUSA sequences, or sequences generated based on a complex Gaussian random number.

In an embodiment, the first reference signal includes at least one of a preamble signal, a pilot signal or a DMRS.

In an embodiment, the mapping relationship between the sequences in the first reference signal sequence set and the sequences in the second reference signal sequence set satisfies one of the following:
- an $n^{th}$ sequence in the first reference signal sequence set is associated with an $n^{th}$ sequence in the second reference signal sequence set, where n is a positive integer;
- an $n^{th}$ sequence in the first reference signal sequence set is associated with an $x^{th}$ sequence in the second reference signal sequence set, where n is a positive integer, K is the number of sequences in the second reference signal sequence set, K is a positive integer, and x is mod(n−1, K)+1; or
- an $n^{th}$ sequence in the first reference signal sequence set is associated with a $\lceil n/\lceil N/M \rceil \rceil^{th}$ sequence in the second reference signal sequence set, where n is a positive integer, M is the number of sequences in the second reference signal sequence set, M is a positive integer, N is the number of sequences in the first reference signal sequence set, and N is a positive integer.

The data transmission apparatus provided in this embodiment and the data transmission method applied to the sending end and provided in the preceding embodiments belong to the same concept. For technical details not described in detail in this embodiment, reference may be made to any one of the preceding embodiments. The embodiment has the same beneficial effects as the performed data transmission method.

Embodiments of the present application further provide a transmission device. The data transmission method may be performed by the data transmission apparatus which may be implemented by software and/or hardware and integrated in the transmission device. The transmission device may be a sending end such as a UE, or may be a receiving end such as a base station.

Figure 13:
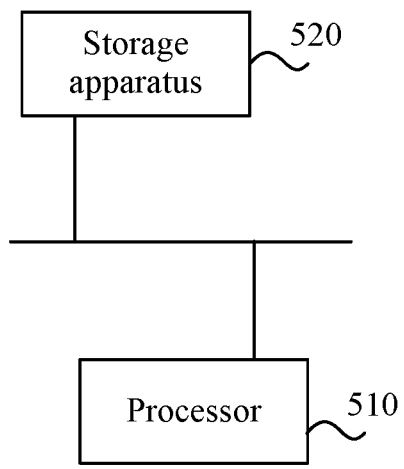
FIG. 13 is a structural diagram of hardware of a transmission device according to an embodiment.

FIG. 13 is a structural diagram of hardware of a transmission device according to an embodiment. As shown in FIG. 13, the transmission device provided in this embodiment includes a processor 510 and a storage apparatus 520. The transmission device may include one or more processors. One processor 510 is shown as an example in FIG. 13. The processor 510 and the storage apparatus 520 in the transmission device may be connected via a bus or in other manners. The connection via the bus is shown as an example in FIG. 13.

One or more programs are executed by the one or more processors 510 to cause the one or more processors to perform the data transmission method in any one of the preceding embodiments.

The storage apparatus 520, as a computer-readable storage medium, in the transmission device may be configured to store one or more programs which may be software programs, computer-executable programs and modules, such as program instructions/modules (for example, modules in the data transmission apparatus shown in FIG. 11, including the signal determination module 310 and the sending module 320) corresponding to the data transmission method in embodiments of the present application. The processor 510 executes software programs, instructions, and modules stored in the storage apparatus 520 to perform various function applications and data processing of the transmission device, that is, to implement the data transmission method in the preceding method embodiments.

The storage apparatus 520 mainly includes a program storage region and a data storage region. The program storage region may store an operating system and an application program required by at least one function. The data storage region may store data (such as the first reference signal and the transmitted data in the preceding embodiments) created based on use of the device. Additionally, the storage apparatus 520 may include a high speed random-access memory and may further include a non-volatile memory, such as at least one magnetic disk memory, a flash memory or another non-volatile solid-state memory. In some examples, the storage apparatus 520 may further include memories located remotely relative to the processor 510, and these remote memories may be connected to the transmission device via a network. Examples of the network include the Internet, an intranet, a local area network, a mobile communication network and a combination thereof.

Moreover, the one or more programs included in the preceding transmission device, when executed by the one or more processors 510, implement the following operations: determining a first reference signal and a second reference signal associated with the first reference signal, where the second reference signal is used for assisting a receiving end in detecting an active sequence in at least one received first reference signal; and ending a transmission packet, where the transmission packet includes the first reference signal, the second reference signal and transmitted data.

Alternatively, the one or more programs included in the preceding transmission device, when executed by the one or more processors 510, implement the following operations: receiving a transmission packet, where the transmission packet includes at least one first reference signal, a second reference signal associated with each of the at least one first reference signal, and transmitted data; detecting an active sequence in the at least one first reference signal according to at least one second reference signal associated with the at least one first reference signal; and determining corresponding receiving data according to the active sequence of the at least one first reference signal.

The transmission device provided in this embodiment and the data transmission methods applied to the sending end and the receiving end in the preceding embodiments belong to the same concept. For technical details not described in detail in this embodiment, reference may be made to any one of the preceding embodiments. The embodiment has the same beneficial effects as the performed data transmission method.

Embodiments of the present application further provide a storage medium containing computer-executable instructions which, when executed by a computer processor, cause the computer processor to perform the data transmission method.

The method includes the following: determining a first reference signal and a second reference signal associated with the first reference signal, where the second reference signal is used for assisting a receiving end in detecting an active sequence in at least one received first reference signal; and sending a transmission packet, where the transmission packet includes the first reference signal, the second reference signal and transmitted data.

Alternatively, the method includes the following: receiving a transmission packet, where the transmission packet includes at least one first reference signal, a second reference signal associated with each first reference signal of the at least one first reference signal, and transmitted data; detecting an active sequence in the at least one first reference signal according to at least one second reference signal associated with the at least one first reference signal; and determining corresponding receiving data according to the active sequence of the at least one first reference signal.

From the preceding description of embodiments, it is apparent to those skilled in the art that the present application may be implemented by use of software and general-purpose hardware or may be implemented by hardware. Based on this understanding, the technical solutions of the present application may be embodied in the form of a software product. The computer software product may be stored in a computer-readable storage medium, such as a floppy disk, a read-only memory (ROM), a random-access memory (RAM), a flash memory, a hard disk, or an optical disk of a computer and includes multiple instructions for causing a computer device (which may be a personal computer, a server, or a network device) to perform the method in any embodiment of the present application.

The preceding are only example embodiments of the present application and not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type appropriate for the local technical environment and may be implemented by using any appropriate data storage technology, such as, but not limited to, a read-only memory (ROM), a random-access memory (RAM), an optical memory device and system (a digital video disc (DVD) or a compact disk (CD)) and the like. Computer-readable media may include non-transitory storage media. A data processor may be of any type suitable for the local technical environment, such as, but not limited to, a general-purpose computer, a special-purpose computer, a microprocessor, a digital signal processing (DSP), an application-specific integrated circuit (ASIC), a field programmable gate array (FPGA), and a processor based on multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without deviating from the scope of the present application. Accordingly, the proper scope of the present application is determined according to the claims.

What is claimed is:

1. A data transmission method, comprising:
   determining a first reference signal and a second reference signal associated with the first reference signal, wherein the second reference signal is used for assisting a receiving end in detecting an active sequence in the first reference signal and in determining a sending end accessing a network according to the active sequence in the first reference signal, and a length of the first reference signal is greater than a length of the second reference signal; and
   sending a transmission packet, wherein the transmission packet comprises the first reference signal, the second reference signal and transmitted data.

2. The data transmission method of claim 1, wherein in each of at least one transmission packet received by the receiving end, the active sequence in the first reference signal comprises one of the following:
   at least one sequence in a first reference signal sequence set;
   at least two sequences with different time domain offsets in a first reference signal sequence set;
   at least two sequences with different frequency domain offsets in a first reference signal sequence set; or
   at least two sequences with different time domain offsets and different frequency domain offsets in a first reference signal sequence set.

3. The data transmission method of claim 1, wherein the first reference signal is one sequence in a first reference signal sequence set, and the second reference signal is one sequence in a second reference signal sequence set; and
   sequences in the first reference signal sequence set and sequences in the second reference signal sequence set satisfy a many-to-one mapping relationship or a one-to-one mapping relationship, wherein any one sequence in the first reference signal sequence set is mapped to a unique sequence in the second reference signal sequence set.

4. The data transmission method of claim 3, wherein a number of the sequences in the first reference signal sequence set is greater than or equal to a number of the sequences in the second reference signal sequence set.

5. The data transmission method of claim 3, wherein the sequences in the second reference signal sequence set are orthogonal; and the second reference signal sequence set is one of the following: a Hadamard sequence, a set of row vectors in a diagonal matrix, or a set of row vectors in a Discrete Fourier Transform (DFT) matrix, or
   wherein the sequences in the second reference signal sequence set are non-orthogonal; and the sequences in the second reference signal sequence set are one of the following: Equiangular Tight Frame (ETF) sequences, Multi-User Shared Access (MUSA) sequences, or sequences generated based on a complex Gaussian random number.

6. The data transmission method of claim 3, wherein a mapping relationship between the sequences in the first reference signal sequence set and the sequences in the second reference signal sequence set satisfies one of the following:
   an $n^{th}$ sequence in the first reference signal sequence set is associated with an $n^{th}$ sequence in the second reference signal sequence set, wherein n is a positive integer;
   an $n^{th}$ sequence in the first reference signal sequence set is associated with an $x^{th}$ sequence in the second reference signal sequence set, wherein n is a positive integer, K is a number of sequences in the second reference signal sequence set, K is a positive integer, and x is mod (n−1, K)+1; or
   an $n^{th}$ sequence in the first reference signal sequence set is associated with a $\lceil n/\lceil N/M \rceil \rceil^{th}$ sequence in the second reference signal sequence set, wherein n is a positive integer, M is a number of sequences in the second reference signal sequence set, M is a positive integer, N is a number of sequences in the first reference signal sequence set, and N is a positive integer.

7. The data transmission method of claim 1, wherein the first reference signal comprises at least one of the following:
a preamble signal, a pilot signal or a Demodulation Reference Signal (DMRS).

8. A non-transitory computer-readable storage medium configured to store a computer program which, when executed by a processor, implements the data transmission method of claim 1.

9. A data transmission method, comprising:
receiving a transmission packet, wherein the transmission packet comprises at least one first reference signal, a second reference signal associated with each of the at least one first reference signal, and transmitted data, and a length of the first reference signal is greater than a length of the second reference signal;
detecting an active sequence in the at least one first reference signal according to at least one second reference signal associated with the at least one first reference signal; and
determining a sending end accessing a network and corresponding receiving data according to the active sequence in the at least one first reference signal.

10. The data transmission method of claim 9, wherein in at least one of the transmission packet, the active sequence in the at least one first reference signal comprises one of the following:
at least one sequence in a first reference signal sequence set;
at least two sequences with different time domain offsets in a first reference signal sequence set;
at least two sequences with different frequency domain offsets in a first reference signal sequence set; or
at least two sequences with different time domain offsets and different frequency domain offsets in a first reference signal sequence set.

11. The data transmission method of claim 9, wherein a first reference signal sent by each transmitting end is one sequence in a first reference signal sequence set, and a second reference signal sent by each transmitting end is one sequence in a second reference signal sequence set; and
sequences in the first reference signal sequence set and sequences in the second reference signal sequence set satisfy a many-to-one mapping relationship or a one-to-one mapping relationship, wherein any one sequence in the first reference signal sequence set is mapped to a unique sequence in the second reference signal sequence set.

12. The data transmission method of claim 11, wherein detecting the active sequence in the at least one first reference signal according to the at least one second reference signal associated with the at least one first reference signal comprises:
determining an activity degree of a potentially active sequence in the at least one first reference signal according to a signal receiving matrix of the at least one second reference signal, and taking a set number of potentially active sequences with highest activity degrees in the at least one first reference signal as the active sequence in the at least one first reference signal;
wherein in at least one of the transmission packet, the potentially active sequence in the at least one first reference signal comprises one of the following:
each sequence in the first reference signal sequence set;
sequences of each sequence in the first reference signal sequence set at different time domain offsets;
sequences of each sequence in the first reference signal sequence set at different frequency domain offsets; or
sequences of each sequence in the first reference signal sequence set at different time domain offsets and different frequency domain offsets;
wherein determining the activity degree of the potentially active sequence in the at least one first reference signal according to the signal receiving matrix of the at least one second reference signal associated with the at least one first reference signal comprises:
performing the following operations on each first reference signal of the at least one first reference signal:
calculating a spatial domain combining vector corresponding to a potentially active sequence in the each first reference signal;
combining the spatial domain combining vector with a signal receiving matrix of a second reference signal corresponding to the each first reference signal to obtain a combining result, wherein the spatial domain combining vector corresponds to the second reference signal; and
calculating a Euclidean distance between the combining result and a corresponding sequence in the second reference signal sequence set, wherein the Euclidean distance is negatively correlated with the activity degree.

13. The data transmission method of claim 11, wherein a number of the sequences in the first reference signal sequence set is greater than or equal to a number of the sequences in the second reference signal sequence set.

14. The data transmission method of claim 11, wherein the sequences in the second reference signal sequence set are orthogonal; and the second reference signal sequence set is one of the following: a Hadamard sequence, a set of row vectors in a diagonal matrix, or a set of row vectors in a Discrete Fourier Transform (DFT) matrix; or
wherein the sequences in the second reference signal sequence set are non-orthogonal; and the sequences in the second reference signal sequence set are one of the following: Equiangular Tight Frame (ETF) sequences, Multi-User Shared Access (MUSA) sequences, or sequences generated based on a complex Gaussian random number.

15. The data transmission method of claim 11, wherein a mapping relationship between the sequences in the first reference signal sequence set and the sequences in the second reference signal sequence set satisfies one of the following:
an $n^{th}$ sequence in the first reference signal sequence set is associated with an $n^{th}$ sequence in the second reference signal sequence set, wherein n is a positive integer;
an $n^{th}$ sequence in the first reference signal sequence set is associated with a (mod (n−1, K)+1)th sequence in the second reference signal sequence set, wherein n is a positive integer, K is a number of sequences in the second reference signal sequence set, and K is a positive integer; or
an $n^{th}$ sequence in the first reference signal sequence set is associated with a $\lceil n/\lceil N/M\rceil\rceil^{th}$ sequence in the second reference signal sequence set, wherein n is a positive integer, M is a number of sequences in the second reference signal sequence set, M is a positive integer, N is a number of sequences in the first reference signal sequence set, and N is a positive integer.

16. The data transmission method of claim 9, wherein the at least one first reference signal comprises at least one of the following:
- a preamble signal, a pilot signal or a Demodulation Reference Signal (DMRS).

17. A transmission device, comprising:
at least one processor; and
a storage apparatus, which is configured to store at least one program;
wherein when executed by the at least one processor, the at least one program causes the at least one processor to perform the data transmission method of claim 9.

18. A non-transitory computer-readable storage medium configured to store a computer program which, when executed by a processor, implements the data transmission method of claim 9.

19. A transmission device, comprising:
at least one processor; and
a storage apparatus, which is configured to store at least one program;
wherein when executed by the at least one processor, the at least one program causes the at least one processor to perform the following:
determining a first reference signal and a second reference signal associated with the first reference signal, wherein the second reference signal is used for assisting a receiving end in detecting an active sequence in the first reference signal and in determining a sending end accessing a network according to the active sequence in the first reference signal, and a length of the first reference signal is greater than a length of the second reference signal; and
sending a transmission packet, wherein the transmission packet comprises the first reference signal, the second reference signal and transmitted data.

20. The transmission device of claim 19, wherein in each of at least one transmission packet received by the receiving end, the active sequence in the first reference signal comprises one of the following:
- at least one sequence in a first reference signal sequence set;
- at least two sequences with different time domain offsets in a first reference signal sequence set;
- at least two sequences with different frequency domain offsets in a first reference signal sequence set; or
- at least two sequences with different time domain offsets and different frequency domain offsets in a first reference signal sequence set.

* * * * *